J. A. BERGREN.
SLED RUNNER ATTACHMENT.
APPLICATION FILED JUNE 14, 1912.

1,094,420.

Patented Apr. 28, 1914.
2 SHEETS—SHEET 1.

Witnesses

John A. Bergren,
Inventor
by C.A.Snow & Co.
Attorneys

J. A. BERGREN.
SLED RUNNER ATTACHMENT.
APPLICATION FILED JUNE 14, 1912.

1,094,420.

Patented Apr. 28, 1914.
2 SHEETS—SHEET 2.

John A. Bergren,
Inventor by C. A. Snow & Co.,
Attorneys

Witnesses

UNITED STATES PATENT OFFICE.

JOHN A. BERGREN, OF LAKE PARK, MINNESOTA, ASSIGNOR OF ONE-HALF TO CHARLEY G. BERGREN, OF HANNAFORD, NORTH DAKOTA.

SLED-RUNNER ATTACHMENT.

1,094,420.

Specification of Letters Patent.    Patented Apr. 28, 1914.

Application filed June 14, 1912.   Serial No. 703,718.

*To all whom it may concern:*

Be it known that I, JOHN A. BERGREN, a citizen of the United States, residing at Lake Park, in the county of Becker and State of Minnesota, have invented a new and useful Sled-Runner Attachment, of which the following is a specification.

This invention relates to an improvement in sled runner attachments for go-carts and perambulators.

The primary object of the invention is to provide a runner attachment, which may be normally housed beneath the carriage, and which may be brought in contact with the ground to raise the wheels from contact with the same, the vehicle being supported by the runners.

A further object of the invention is to provide means which may be operated at the rear of the cart for bringing the runners into and out of contact with the ground.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

Figure 1:
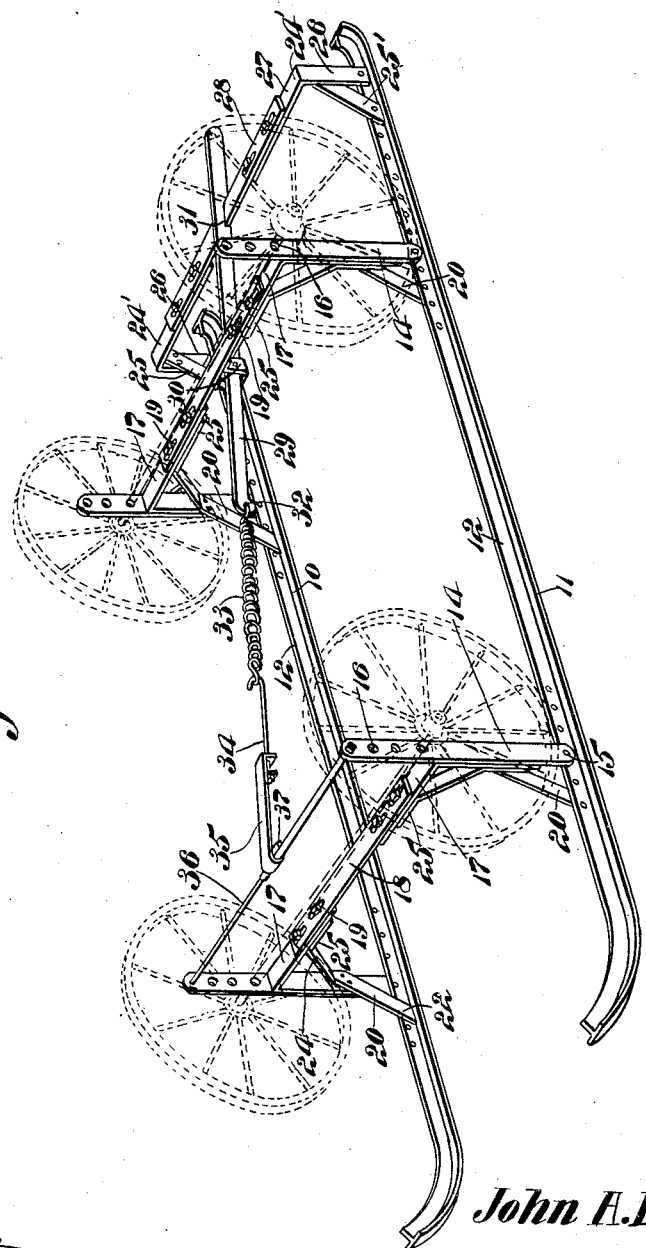
Figure 2:
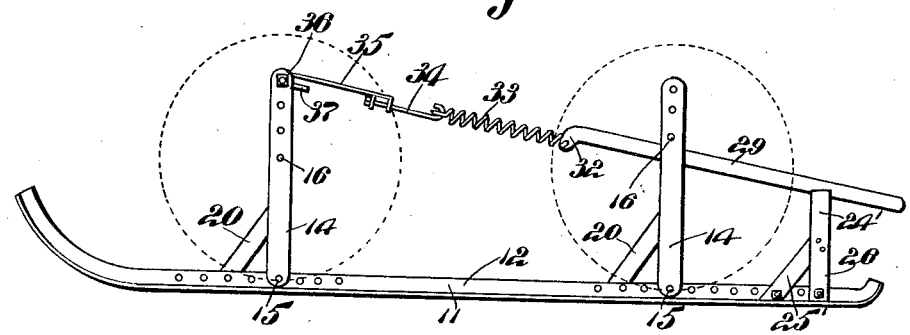
Figure 3:
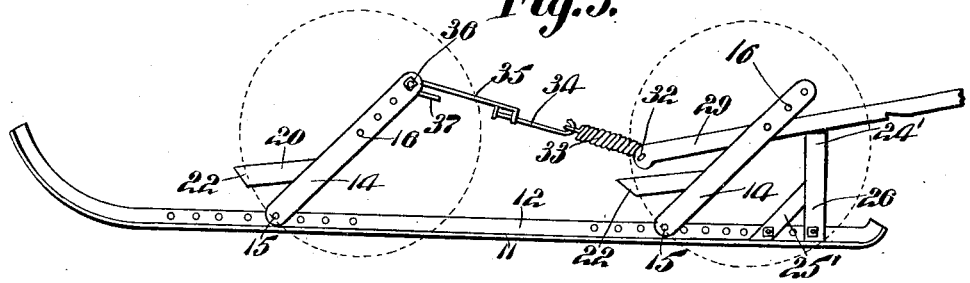
Figure 5:
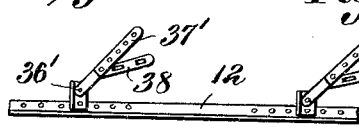
Figure 4:
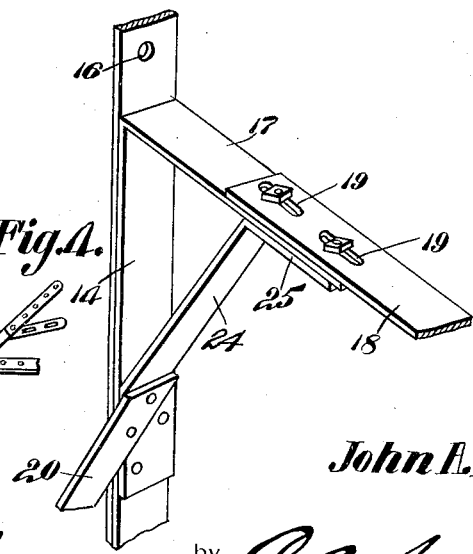

In the drawings Figure 1 is a perspective view. Fig. 2 is a side elevation. Fig. 3 is an elevation, the device being in its folded position. Fig. 4 is a detail view of one of the struts. Fig. 5 is an elevation showing a slightly modified attaching mechanism.

In the drawings, 10 and 11 designate the T-shaped rails, the terminals of which are curved upward, the rails forming the runners. The ribs 12 of the rails are perforated adjacent the ends of the rails. A pair of standards 14 is pivotally connected to each of the rails, the standards being adjustable longitudinally of the rails, the opening 15 in the lower terminal of the standards receiving a securing device which may be extended through any of the apertures in the rails.

The standards 14 are provided with apertures 16 which receive the axles of the cart, the device in this manner being attached to the running gear of the same. It will be noted that as each standard is provided with a plurality of vertically disposed perforations that the device may be attached to vehicles, and disposed so that the same will contact with the ground regardless of the diameter of the wheels of the vehicles. Secured to each of the standards 14 is an angle iron 17, the angle irons of the corresponding standards of the rails or beams, being connected by the bar 18. This bar is provided with a plurality of elongated slots 19 adjacent its terminals, securing devices passing through the longitudinal extension of the angle irons 17, the bar 18 being adjustable with respect to said angle irons. Thus the width of the runner attachment may be regulated with respect to the width of the vehicle on which the same is mounted.

A strut 20 is secured to the vertically disposed portion of each of the angle irons, said strut forming the downwardly extending shoe 22 which contacts with the rail, the obliquely extending strut 24 which is formed with the off-set 25 being disposed in parallel with the horizontal portion of the angle iron, the securing devices which connect the bar 14 with the angle iron, passing through these struts 20. This construction is carried out on each of the standards, it being noted that when the device is brought to the position shown in Figs. 1 and 2, that the strut will contact with the rails and support the standards in a vertical position.

An angle bar 24' is disposed at the rear of each of the rails, said angle bar being supported by struts 25' which are of substantially the same construction as the struts 20, the downwardly extending portions 26 being secured to the rails. The horizontal extensions 27 of the angle irons 24' are connected by a bar 28 in the same manner as the angle irons of the vertical standards. A latch bar 29 is pivotally supported by the connecting bar 30 of the rear pair of standards, said latch bar being provided with a notch 31 which receives the bar 28 which connects the angle irons. The other terminal 32 of the latch bar 29 is connected to a compressed spring 33 which is connected by means of the adjustable hook 34 with a strap 35. A transversely disposed bar 36 connects the upper terminals of the forward pair of standards, the strap 35 being formed with the curved extension 37 which embraces the rod or bar 36. The tendency of the springs 33 is to maintain the standards in the position shown in Fig. 3, that is their normal folded position beneath the cart, the shoes 20 being brought out of contact with the rails which are raised off of the ground, the axles serving as a pivot on which the standards swing.

It will be noted that when the latch bar 29 is moved to the position shown in Fig. 1 and the bar 28 positioned within the notch 31 of said latch bar that the standards will be supported as shown in Figs. 1 and 2, the wheels of the vehicle being brought out of contact with the ground, the vehicle traveling on the rails which constitute the runners.

It will be noted that the free terminal of the latch bar 29 may be conveniently operated by the foot of the operator, the free terminal of said bar being disposed at the rear of the cart where the same may be lifted by the foot of the operator, the coiled spring 33 forcing the rails and the standards to assume the position shown in Fig. 3.

The many advantages of a construction of this character will be clearly apparent, as it will be noted that the rails may be readily brought in contact with the ground, and the wheels forced out of contact with the ground by the manipulation of the free terminal of the latch bar 29, it being noted that the carriage may be slightly raised as the runners are forced in contact with the ground. It will also be noted that the structure is such as may be adjusted for any length or width of cart, the connecting bars 18 and 30 permitting of the transverse adjustment, the standards being disposed at any point along the rails, this adjustment permitting the device to be attached to carriages regardless of the difference between the axles.

In Fig. 5 of the drawings, the runners 12 are provided with standards 36' of angle iron which pivotally support the apertured standards 37', slotted links 38 being supported by said standards. It will be noted by this construction that the device is applicable to a high wheel cart, as well as a low wheel cart, it being noted that the construction will not carry the runners forward to the extent that the same would be carried by the preferred construction, it being noted that this construction is adaptable for high wheel carriages as well as carts in which the diameter of the front and rear wheels are different. It will be noted that a device of this character may be attached to carts which are not provided with axles, the body of the cart being provided with suitable attaching mechanism. It will also be noted that the structure is such as may be easily and economically manufactured and that the various parts may be readily assembled.

What is claimed is:—

1. A sled runner attachment for wheeled vehicles, comprising, rail runners, apertured standards receiving the axles of the vehicle, resilient means connected to the standards above the front axle and to the standards below the rear axle, and a locking member for holding the standards in an upright position.

2. A sled runner attachment for wheeled vehicles, comprising rail runners, standards pivotally connected to said runners and provided with a stop to limit the movement of said standards with relation to the runners in one direction, a bar connecting said standards above the front vehicle axle, a spring connected to said bar and to a bar below the rear vehicle axle, and means for maintaining the standards in a vertical position.

In testimony that I claim the foregoing as my own, I have hereto affixed my signature in the presence of two witnesses.

JOHN A. BERGREN.

Witnesses:
J. H. MOAN,
H. F. ERICKSON.

Copies of this patent may be obtained for five cents each, by addressing the "Commissioner of Patents, Washington, D. C."